United States Patent [19]

Cote

[11] Patent Number: 4,858,943
[45] Date of Patent: Aug. 22, 1989

[54] BOAT TRAILER

[76] Inventor: Warren E. Cote, 92 Longpond Dr., Tyngsboro, Mass. 01879

[21] Appl. No.: 223,654

[22] Filed: Jul. 25, 1988

[51] Int. Cl.⁴ .............................................. B63P 3/10
[52] U.S. Cl. ................................ 280/414.1; 414/534
[58] Field of Search .............. 280/414.1, 414.2, 414.3; 414/531, 532, 533, 534

[56] References Cited

U.S. PATENT DOCUMENTS

| | | | |
|---|---|---|---|
| 3,122,245 | 2/1964 | MacKusick et al. | 280/414.1 |
| 3,608,754 | 9/1971 | Pork | 414/534 |
| 4,529,217 | 7/1985 | Wood | 280/414.1 |
| 4,530,634 | 7/1985 | Johnson | 280/414.1 |
| 4,592,694 | 6/1986 | Johnson | 280/414.1 |

*Primary Examiner*—Charles A. Marmor
*Assistant Examiner*—Richard Camby
*Attorney, Agent, or Firm*—Macdonald Wiggins

[57] ABSTRACT

A boat trailer having a frame with a forwardly extending tongue and a paddle cradle for a boat hull has a pair of longitudinally disposed arms pivotally hinged forwardly to each side element of the frame. Each independently pivoted arm includes a float attached at its rearwardly extending distal end. An outrigger guide arm is attached to the distal end of each arm and extends outwardly and upwardly such that the floats cause each guide arm to extend above the water level during launching and recovery of a boat. A line attached to a boat bow fed over a post and hook on the tongue and aft to a slot in a guide arm permits launching and recovery of a boat by one person.

7 Claims, 3 Drawing Sheets

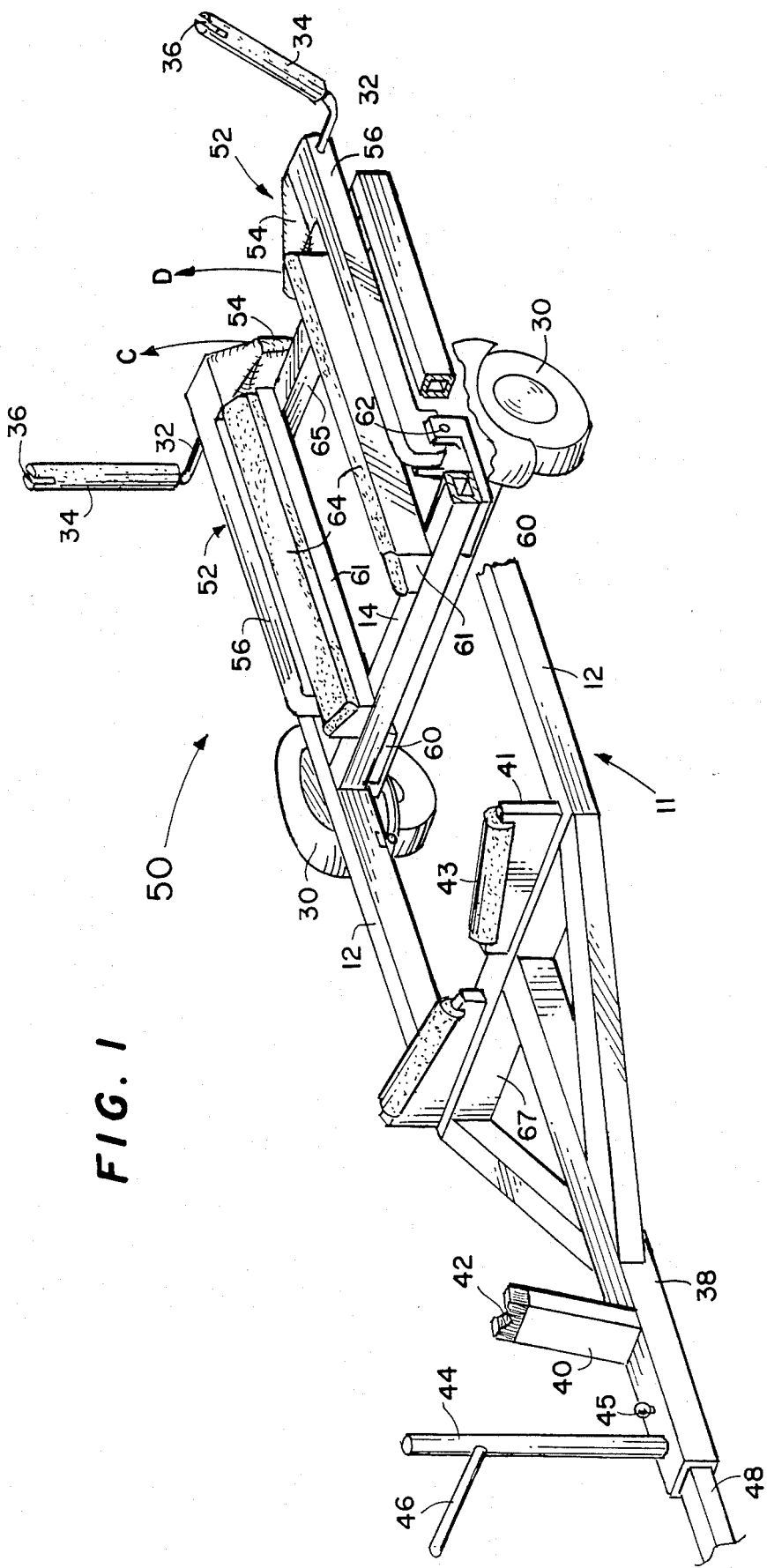

BOAT TRAILER

BACKGROUND OF THE INVENTION

1. Field of the Invention

The present invention relates to vehicle trailers for carrying boats, and more particularly to an improved boat trailer that permits safe one-man launching and recovery in uneven ramps or beaches.

2. Description of the Prior Art

Conventional prior art boat trailers are generally adequate for launching and recovering boats when a properly designed and maintained launching ramp is available, and when the water is relatively calm. However, when launching from a sand beach or the like, the trailer may tilt laterally. When the trailer includes outrigged guidearms, an arm on one side may be low or below the water level. In such case, there will be a risk of damage to the boat hull. When recovering a boat in windy weather and rough water, there is a risk of damage when the bolster or cradle elements are well below the surface of the water. This situation is also aggravated when the bottom surface of the body of water is uneven and the trailer tilts laterally. To safely launch and recover a boat, prior art trailers generally require two persons if possible damage to the boat is to be avoided.

Attempts to solve some of the above problems are known. In U.S. Pat. No. 3,608,754 to Park, a pair of bolsters at the rear of a trailer chassis is attached to a pair of long arms pivoted near the front of the chassis. A large flotation block is mounted below the bolsters. When the trailer is backed down a ramp, the pair of bolsters tend to float. Although this construction is an improvement over the conventional trailer, it does not solve the problem of uneven surfaces since one bolster may be above the water level and the other bolster below water. MacKusick et al., U.S. Pat. No. 3,122,245, disclose a trailer with longitudinally pivoted cradle pads which tend to fit the hull shape but which will normally be under water. Wood, U.S. Pat. No. 4,529,217, teaches a set of outrigger arms with automatic alignment means. Pat. Nos. 4,530,634 and 4,592,694 to Johnson both disclose horizontally pivoted rollers which pivot to match the hull contour of a boat. None of these patents fully solve the problems of one-man launching and recovering a boat in rough water and on an uneven ramping surface.

SUMMARY OF THE INVENTION

The present invention is a boat trailer having a pair of padded longitudinal cradle elements at the rear portion of a conventional trailer chassis. A longitudinal arm is pivoted at a midpoint of the trailer chassis, outboard of each cradle element. A float is attached to the distal end of each arm. An outrigger guide arm extends laterally and upwardly from the distal end of each longitudinal arm to guide a boat hull over the cradle element. A slot is cut in the distal end of each guide arm.

At the forward end of the chassis, a tongue, having a telescoping extension, extends forward and includes a ball hitch socket. A vertical post extends upward from the forward end of the tongue and includes a hook at the top end thereof. Conventional transverse bolsters are provided at the forward end of the chassis for the forward keel and sides of a boat hull being carried.

A boat is supported at the stern portion by the two cradle elements and at the bow portion by the bolsters. A line is tied to the bow of the boat, placed over the hook of the forward post, and the opposite end thereof inserted in the slot in one of the outrigger guide arms. The end of the line is fed through a large float.

When launching the boat, the trailer may be backed a short distance down a ramp and the tongue extended. This permits maintaining the vehicle on a horizontal portion of the ramp and the capability of backing the trailer farther down the ramp to more fully float the boat than otherwise possible. The line temporarily attached to the forward post and guidearm prevents the boat from drifting. The longitudinal arms float with the boat, maintaining the guides adjacent the hull at the stern to prevent lateral drift during wind or in rough water. When the boat is launched adjacent a dock, the floating cradle elements and guide arms prevent the boat from contacting the dock. Advantageously, the launching operation requires only one person.

After backing the trailer to the desired point, the driver may leave the vehicle and complete the launching from the dock. The floating line is recovered and removed from the slot in the guide arm and from the hook. The boat may then be pulled outward from the cradle elements and guide arms, and moored to the dock. The driver may then pull the trailer from the ramp and park as required.

When recovering the boat, the line is used to pull the boat into the guide arms which will be floating on top of the water. The boat will then settle onto the cradle elements as the trailer is towed from the ramp. Thus, recovery may be accomplished by one person.

Since the longitudinal arms and guide arms pivot independently, they will both float on the surface of the water even when the ramping surface slopes laterally or is uneven.

It is therefore a principal object of the invention to provide a boat trailer having independently floating outrigger guide arms to facilitate launching and recovery of a boat.

It is another object of the invention to provide an improved boat trailer that will permit launching and recovery of a boat during high winds and rough waters without risk of damage of the hull.

It is still another object of the invention to provide an improved boat trailer that will permit launching and recovery of a boat by one person.

It is yet another object of the invention to provide an improved boat trailer having independently floating outrigger guide arms to permit both guide arms to be on the surface of the water when the launching ramp surfaces slope laterally or are uneven.

These and other objects and advantages of the invention will be apparent from the following detailed description when read in conjunction with the drawings.

BRIEF DESCRIPTION OF THE DRAWINGS

FIG. 1 is a perspective view of the preferred embodiment of the invention;

FIG. 2 is a partial view of the boat trailer of FIG. 1 showing an extensible tongue thereof;

DETAILED DESCRIPTION OF THE PREFERRED EMBODIMENT

Figure 3:
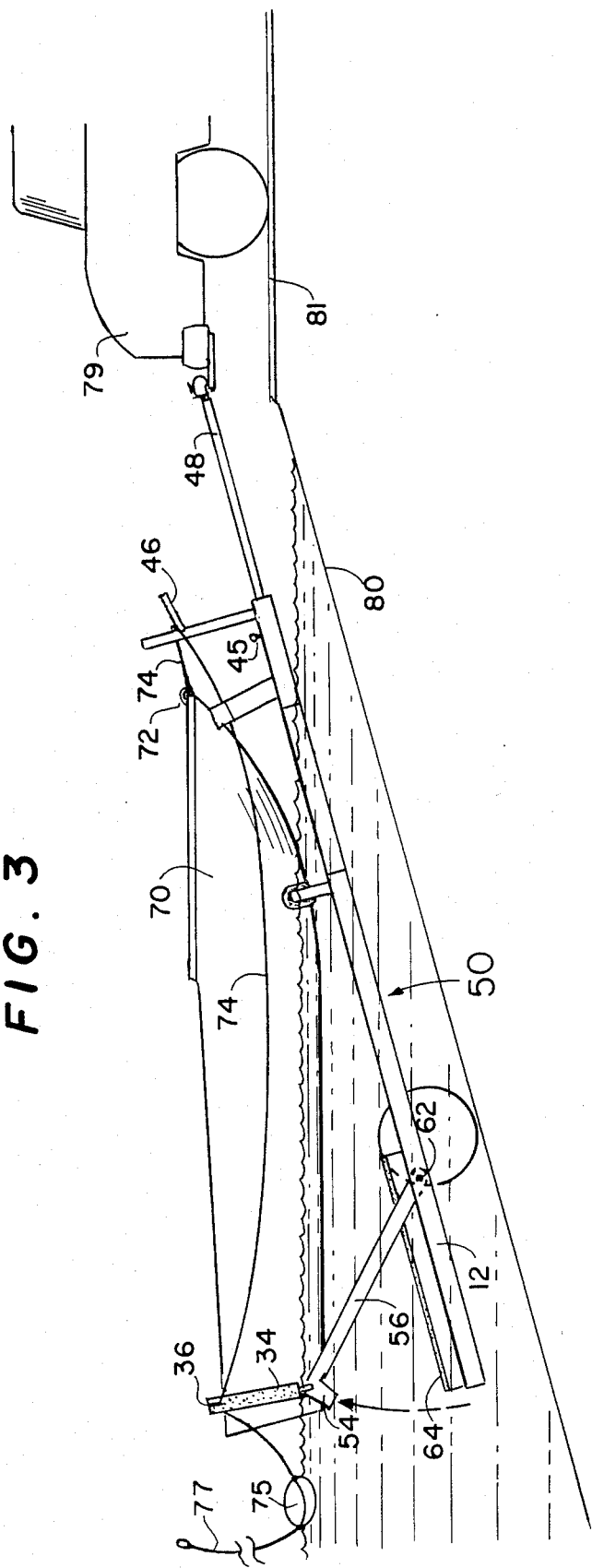
FIG. 3 shows the boat trailer of FIG. 1 in position to be launched by one person.

Referring to FIG. 1, a boat trailer 10 is shown in perspective view with a portion thereof cut away. A rectangular frame 11 includes longitudinal side members 12, a front cross bar 67, a central cross bar 14, and a rear crossbar 65. A tongue 38 extends forward from front crossbar 67 and includes a telescoping tongue extension 48 to be described in more detail hereinafter. The frame 11 has a pair of front bolsters 41 with pads 43 for supporting a forward portion of a boat hull.

Extending longitudinally between central crossbar 14 and rear crossbar 65 is a pair of parallel rear bolsters 61 and pads 64 for supporting aft portions of a boat hull. A first post 40 with cradle pad 42 is provided at a forward portion of tongue 38 which accepts the bow portion of a boat hull. A second post 44 includes a hook 46 for a line at its upper end.

A pair of pivot brackets 60 is attached to crossbar 14. The brackets pivotally support a pair of rearwardly extending float arms 56. As will be seen in the cutaway portion of frame members 12 and 61, arms 56 are attached to brackets 60 by pivots 62. At the distal end of each float arm 56, a float element 54 is attached. float elements 54 may be formed of wood, plastic foam, or other buoyant material. Preferably, float elements 54 extend rearward beyond bolsters 64. As indicated by arrows C and D, floats 52 can each independently pivot upward.

A padded guide arm 34 is attached to each float 52 by bracket 32. Each guide arm 34 has a slot 36 in its upper end. Guide arms 34 are angled outward and rearward and serve to guide a boat hull over frame 1 as will be discussed below.

Referring to FIG. 2, tongue 38 is shown, having a telescoping extension 48. When the boat trailer 50 is being towed to a launch site, extension 48 is retracted. A pin 45 is inserted through forward opening 47. As shown in FIG. 2, pin 45 is inserted through rear opening 49 in the extended position.

FIG. 3 is an elevation view of a typical launch site. The tongue extension 48 has been extended, and the trailer 50 backed down ramp 80. Because of extension 48, vehicle 70 may remain on a horizontal surface 81. Prior to launching, line 74 is attached to bow 34, hooked around hook 46, and inserted in slot 36 of guide arm 34. The outer end of line 72 is attached to a small float 75, with outer end 77 extending therefrom. As trailer 50 proceeds down ramp 80, floats 54 cause arms 56 to pivot about pivot 62 and floats 54 will remain at the surface of the water as backing continues. This action maintains both outrigger guide arms 34 projecting fully from the water surface. Boat hull 70 will float off of rear bolsters 64 as shown and guide arms 34 prevent lateral drift thereof. The line is then unhooked from slot 36 from an adjacent dock, or from the boat. The line is removed from hook 46 and the boat may then be pulled or floated free from trailer 50. During recovery, the line is again installed over hook 46 and slot 36 when the boat is in the position shown. As the trailer is towed from the ramp, the line maintains the boat in position between floating guide arms as it settles onto bolsters 64.

ALTERNATIVE EMBODIMENT

Figure 4:
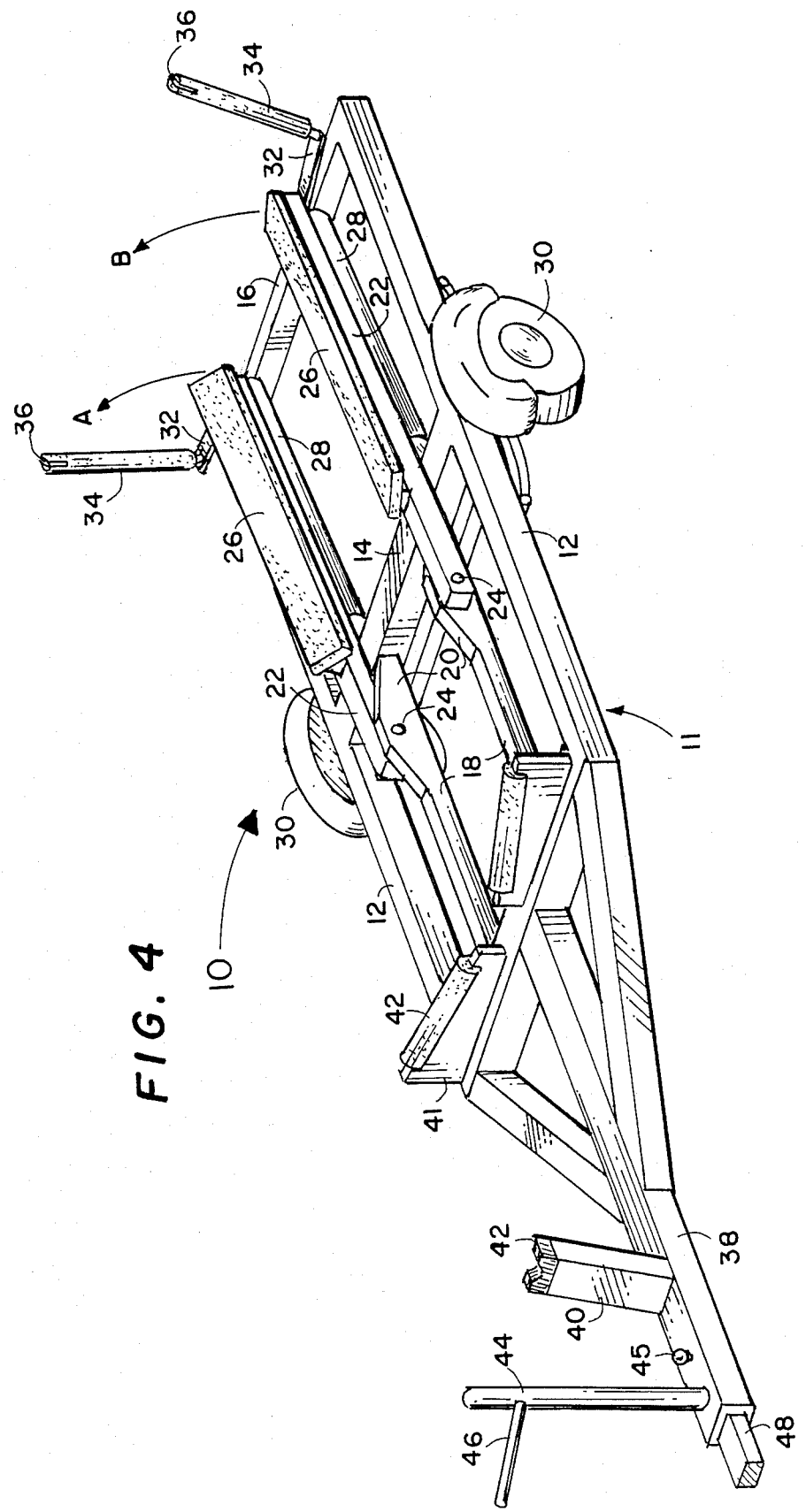
FIG. 4 shows an alternative embodiment of the invention.

FIG. 4 is a perspective view of an alternative embodiment of the invention. Elements in common with the embodiment of FIG. 1 are identified by like reference numerals. Trailer 10 includes frame 11 which includes a pair of longitudinal members 18 between front crossbar 67 and central crossbar 14. Rear portions 20 of members 18 form pivots 24 for cradle arms 22 which extend to and rest on rear crossbar 16. Each cradle arm 22 includes an angled pad 26 to mate with the aft hull contour of a boat to be carried. A float element 28, which may be formed of plastic foam or hollow metal construction is attached beneath each cradle arm 22.

A bracket 32 is attached to the distal end of each cradle arm 22 and extend outboard therefrom. An essentially vertically oriented guide arm 34 extends upward and outward from each bracket 32. A slot 36 is provided in the distal end of each guide arm 36.

The launching and recovery of trailer 10 is similar to that of the preferred embodiment. As floats 28 raise guide arms 34 and cradle elements 26, the board hull remains in contact with pads 26. Since cradle arms 22 are independently pivoted, operation over an uneven ramp surface will not be significantly affected.

Although specific embodiments of the invention have been disclosed, these are for exemplary purposes only and various modifications will be apparent to those of skill in the art. Such modifications are considered to be within the spirit and scope of the invention.

I claim:

1. A boat trailer having a frame, said frame having a forward extending tongue, and a pair of parallel bolsters longitudinally disposed at a rear portion of said frame, the improvement comprising; a pair of float arms independently disposed longitudinally with respect to said frame in which each one of said pair is outboard of and adjacent to one of said pair of bolsters, a forward end of each said float arms pivoted transversely to said frame wherein each of said arms is independently rotatable about its pivot;

a pair of outwardly and upwardly extending guide arms, one of said guide arms attached to the distal end of each of said float arms; and a pair of floats, one of said floats attached to the distal end of each of said float arms wherein said floats cause said pair of guide arms to extend above the surface of a body of water during launching and recovery of a boat.

2. The trailer as recited in claim 1 which further includes:

a tongue extender telescopically engaged with said tongue; and means for locking said tongue extender in a retracted position and in an extended position.

3. The trailer as recited in claim 1 in which each of said guide arms includes a slot for a line in the distal end thereof.

4. The trailer as recited in claim 3 which further comprises an essentially vertical post extending upwardly from said tongue and having a hook element adjacent a distal end thereof for engaging a line from a bow of a boat, the free end of said line engaging said slot of one of said guide arms.

5. The trailer as recited in claim 4 in which said line includes a float adjacent said free end thereof.

6. A boat trailer for transporting a boat thereon including apparatus for permitting launching and recovering of said boat by one person comprising:

an elongate essentially rectangular frame having a pair of side elements, and front and rear transverse elements;

a tongue extending forwardly from the front transverse element of said frame;

a set of bolsters attached to said frame for supporting the hull of a boat;

a post extending essentially vertically from a forward end of said tongue, said post including a hook for a line, said hook adjacent a distal end of said post;

first and second independent longitudinally extending elongate arms, said first arm having a proximal end thereof pivotally hinged forwardly and to one side element of said frame, and said second arm having a proximal end thereof pivotally hinged forwardly and to the other side element of said frame, wherein each arm is independently pivotable, and each of said arms having a float attached to a distal end thereof;

a pair of outrigger guide arms in which one of said pair is attached to said distal end of each of said pivoted arms and extends upward and outward wherein said floats cause each of said guide arms to independently extend above water level during launching and recovery of a boat, each of said guide arms including a line engaging slot in a distal end thereof; and a launching and recovery line having a first end attached to the bow of a boat being transported, said line hooked around said post, over said hook, and engaged with said slot in one of said guide arms, a free end of said line extending therefrom.

7. A boat trailer having an elongate essentially rectangular frame, said frame having a forward extending tongue, the improvement comprising:

a pair of independent elongate cradle arms disposed longitudinally with respect to said frame having proximal ends thereof independently pivotally hinged forwardly and to each side of said frame, said arms extending rearwardly of said frame;

a pair of elongate cradle pads, one of said pads attached to each of said cradle arms thereby forming a boat hull supporting cradle:

a pair of guide arms, one of said guide arms attached to a distal end of each of said cradle arms and extending outward and upward therefrom; and a pair of floats, one of said floats attached on an underside of each of said pair of cradle arms wherein each of said guide arms will be independently extended above water level and said cradle pads will be adjacent the water level during launching and recovering of a boat.

* * * * *